(12) United States Patent
Lee

(10) Patent No.: US 7,614,943 B2
(45) Date of Patent: Nov. 10, 2009

(54) UNDERGROUND CABINET COOLING APPARATUS AND METHOD

(75) Inventor: Lin Hung Lee, Chungho (TW)

(73) Assignee: 3M Innovative Properties Company, St. Paul, MN (US)

( * ) Notice: Subject to any disclaimer, the term of this patent is extended or adjusted under 35 U.S.C. 154(b) by 214 days.

(21) Appl. No.: 10/883,604

(22) Filed: Jul. 1, 2004

(65) Prior Publication Data

US 2006/0000628 A1    Jan. 5, 2006

(51) Int. Cl.
H05K 5/00 (2006.01)
(52) U.S. Cl. ........................................ 454/184
(58) Field of Classification Search ................. 454/184
See application file for complete search history.

(56) References Cited

U.S. PATENT DOCUMENTS

| | | | |
|---|---|---|---|
| 2,247,936 A | 7/1941 | Bishop | |
| 3,377,487 A | 4/1968 | McNulty | |
| 3,482,030 A | 12/1969 | Wisniewski | |
| 3,503,025 A | 3/1970 | Weinfurt | |
| 3,599,134 A | 8/1971 | Galloway | |
| 3,892,910 A | 7/1975 | Smith | |
| 4,623,753 A | 11/1986 | Feldman et al. | |
| 5,401,902 A | 3/1995 | Middlebrook et al. | |
| 5,635,673 A | 6/1997 | Foss | |
| 5,722,204 A | 3/1998 | Stieb et al. | |
| 5,828,001 A | 10/1998 | Schilham | |
| 6,402,613 B1 * | 6/2002 | Teagle ........................ 454/195 |
| 2002/0196605 A1 | 12/2002 | Hilpert et al. | |
| 2004/0007347 A1 * | 1/2004 | Stoller ........................ 165/47 |
| 2005/0145631 A1 * | 7/2005 | Flynn ........................ 220/484 |

FOREIGN PATENT DOCUMENTS

| | | |
|---|---|---|
| DE | 41 40 701 C 1 | 12/1992 |
| DE | 200 19 873 U 1 | 4/2001 |
| EP | 0 605 118 A 2 | 7/1994 |
| EP | 1 223 651 A 1 | 7/2002 |
| NL | 1 011 825 C | 10/2000 |
| WO | WO 2004/091065 A1 | 10/2004 |
| WO | WO 2005/053370 A1 | 6/2005 |

* cited by examiner

Primary Examiner—Steve McAllister
Assistant Examiner—Helena Kosanovic
(74) Attorney, Agent, or Firm—Gregg H. Rosenblatt

(57) ABSTRACT

A connection system for interconnecting communication media comprises a housing including a cavity and an airflow opening, a cover adapted to cooperate with the housing to define an air reservoir, and an airflow agitator for causing air to move from the air reservoir to the housing through the airflow opening. The air reservoir contains at least a portion of the housing including the airflow opening, and the air reservoir and the housing cooperate to prevent fluid from entering the cavity. One method for dissipating heat within a connection system comprises providing a connection system including a housing with an airflow opening and a cover adapted to cooperate with the housing to define an air reservoir containing at least a portion of the housing and the airflow opening. The method further includes forcing air from the air reservoir to the housing through the airflow opening.

15 Claims, 5 Drawing Sheets

UNDERGROUND CABINET COOLING APPARATUS AND METHOD

FIELD

The present invention relates to a connection system and a method for interconnecting communications media. In particular, the present invention relates to a waterproof underground cabinet for interconnecting communications media having a system for cooling components within the underground cabinet, and the present invention relates to a method for cooling the components within the underground cabinet.

BACKGROUND

Currently, there is a requirement for communications media, such as fiber optic, copper, coaxial cables, or the like to be interconnected at various locations in order to provide communication services over distributed areas, such as to individuals' houses, or the like. This is typically achieved by providing junction boxes or cabinets to interconnect wires, with the cabinets being located underground in a convenient location.

An underground cabinet typically contains electrical connections and optionally other electronic components. The electrical components during operation will heat up and without proper cooling may become damaged. It is important that the contents of the underground cabinet are protected from contaminants such as dust and moisture. Various designs have been developed for protecting the underground cabinet from contaminants. However, such designs often cannot provide for adequate airflow into and out of the underground cabinet to properly cool the electrical components while also protecting the electrical components in the underground cabinet from contaminants.

BRIEF SUMMARY

A connection system for interconnecting communication media comprises a housing including a cavity and an airflow opening, a cover adapted to cooperate with the housing to define an air reservoir, and an airflow agitator causing air to move from the air reservoir to the housing through the airflow opening. The air reservoir contains at least a portion of the housing including the airflow opening, and the air reservoir and the housing cooperate to prevent fluid from entering the cavity.

One method for dissipating heat within a connection system for interconnecting communication media comprises providing a connection system including a housing with an airflow opening and a cover adapted to cooperate with the housing to define an air reservoir containing at least a portion of the housing and the airflow opening. The air reservoir and the housing cooperate to prevent fluid from entering the housing. The method further includes forcing air from the air reservoir to the housing through the airflow opening.

While the above-identified figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the spirit and scope of the principals of this invention. The figures may not be drawn to scale. Like reference numbers have been used throughout the figures to denote like parts.

DETAILED DESCRIPTION

Figure 1:
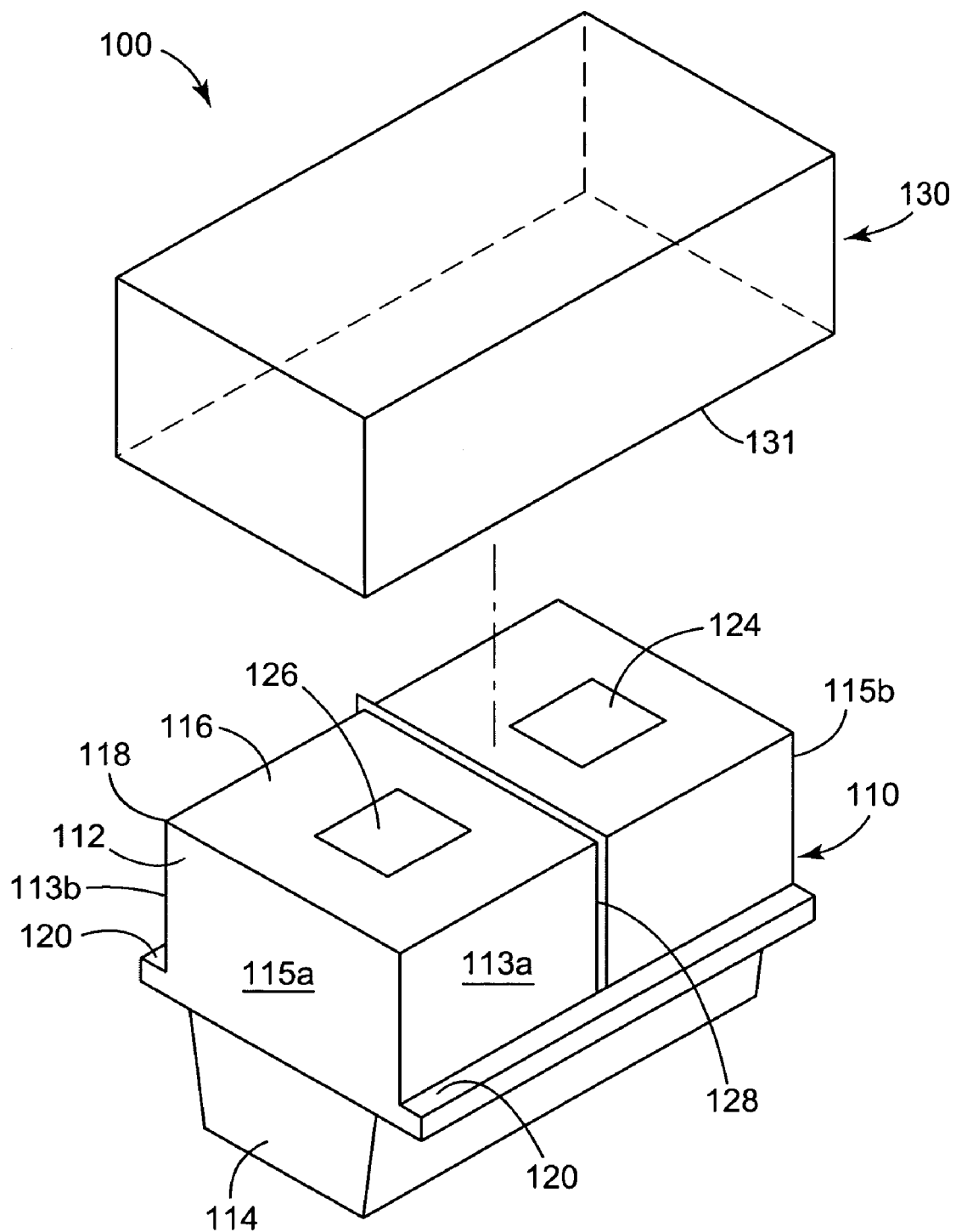
FIG. 1 is perspective view of one embodiment of the connection system of the present invention.

FIG. 1 is perspective view of one embodiment of the connection system of the present invention. A similar connection system is disclosed in PCT Application number PCT/US2004/009986, titled "Connection System," filed on Apr. 1, 2004, the disclosure of which is hereby incorporated by reference. An underground cabinet 100 includes a housing 110 and a separable cover 130. The housing 110 has an upper cavity 112, a lower cavity 114, sides 113a and 113b, and ends 115a and 115b. A lid 116 covers the otherwise open top of the upper cavity 112. An upper lip 118 is provided around the perimeter of the upper cavity 112 to allow for the lid 116 to be removably mounted to the upper cavity 112 for access to the contents of the housing 110. The lid 116 may be attached to the upper lip 118 by a variety of attaching means, such as screws, clips, or the like. The lid 116 may also be sealed to the upper lip 118.

Located on the lid 116 is an airflow-in opening 124 and an airflow-out opening 126, which provide airflow access into and out of the housing 110 of the underground cabinet 100. The airflow-in opening 124 and airflow-out opening 126 may each be covered with a filter, which prevents dust and other debris from entering the housing 110. In one embodiment, the filter can be any suitable 3M™ Filtrete™ Filter, available from 3M Company of St. Paul, Minn., USA.

A gasket 128 is provided along the lid 116 and sides 113a and 113b of the exterior of the housing 110. In the embodiment shown in FIG. 1, the gasket extends entirely along the sides 113a and 113b of the exterior of the upper cavity 112 to the lower lip 120. The gasket 128 separates the airflow-in opening 124 from the airflow-out opening 126. The gasket 128 may be positioned at various locations on the lid 116 and sides 113a and 113 (see FIG. 1, 2, 5). In other embodiments, the gasket 128 may extend along only a portion of the sides 113a and 113b of the exterior of the housing 110 or along only a portion of the lid 116.

The cover 130 fits over the upper cavity 112 of the housing 110 and has a bottom edge 131, which rests along two lower lips 120 extending along an exterior edge of the upper cavity 112. The lower lips 120, in the embodiment shown in FIG. 1, extend on two opposites sides 113a and 113b of the housing 110 on the upper cavity 112. The bottom edge 131 of the cover 130 rests on and attaches to the lower lips 120 by any suitable attaching means, such a screws, clips, or the like to secure the cover 130 to the housing 110. In FIG. 1, the underground cabinet 100 is shown with the lower lips 120 extending only along the lengths of the sides 113a and 113b of the underground cabinet 100. It is understood that the lower lips 120 may extend along the length of the ends 115a and 115b of the underground cabinet 100 with the appropriate changes made to the positioning of the gasket 128, airflow-in opening 124, and airflow-out opening 126.

Figure 2:
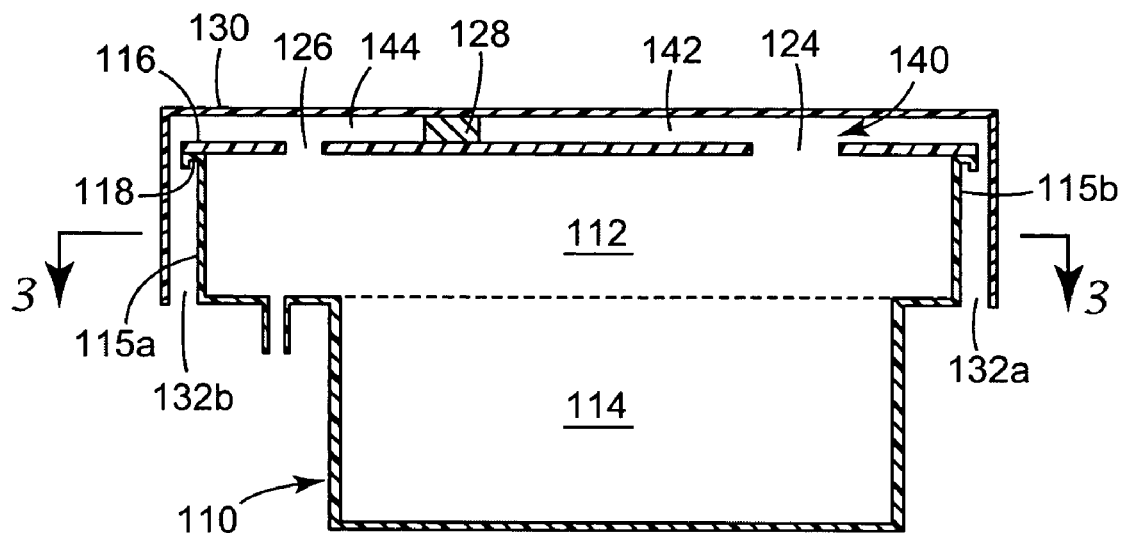
FIG. 2 is a longitudinal vertical sectional view of the housing and cover of the connection system.

FIG. 2 is a longitudinal vertical sectional view of the assembled underground cabinet 100 shown in FIG. 1. The cover 130 is resting and attached to the lower lips 120. (See FIGS. 1 and 2). However, the lower lips 120 are not located on all four sides of the housing 110 such that when the cover is in place over the housing 110, end openings 132a and 132b are formed between the cover 130 and housing 110 on the ends 115a and 115b of the housing 110 where the lower lips 120 are missing.

Figure 3:
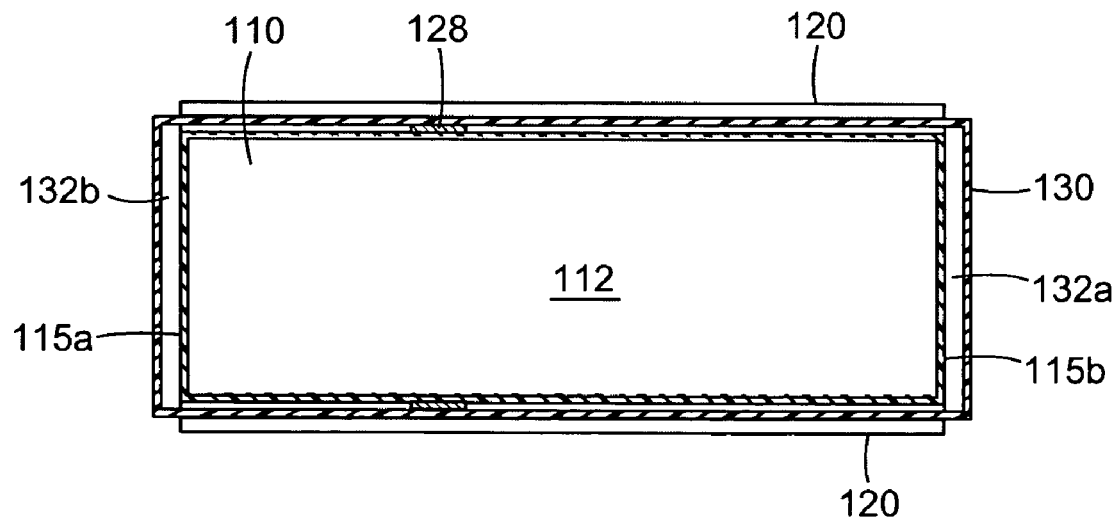
FIG. 3 is a longitudinal sectional view of the housing and cover of the connection system, as taken along lines 3-3 in FIG. 2, with some details removed for clarity of illustration.

FIG. 3 is a longitudinal sectional view of the assembled underground cabinet 100 shown in FIG. 1, taken horizontally through the cover 130 and upper cavity 112. As can be seen, the cover 130 is larger than the upper cavity 112. The bottom edge 131 of the cover 130 contacts and attaches to the lower lip 120 but extends beyond the ends 115a and 115b of the upper cavity 112 not having the lower lip 120 to form the end openings 132a and 132b. The end openings 132a and 132b allow for airflow access into the gap created between an outer wall of the housing 110 and inner wall of the cover 130, which creates an air reservoir 140 there between (see FIG. 2). While only end opening 132a and 132b are illustrated, the end openings 132a and 132b could be located anywhere about the periphery of the housing 110 to allow access to the gap between the housing 110 and the cover 130.

Figure 4:
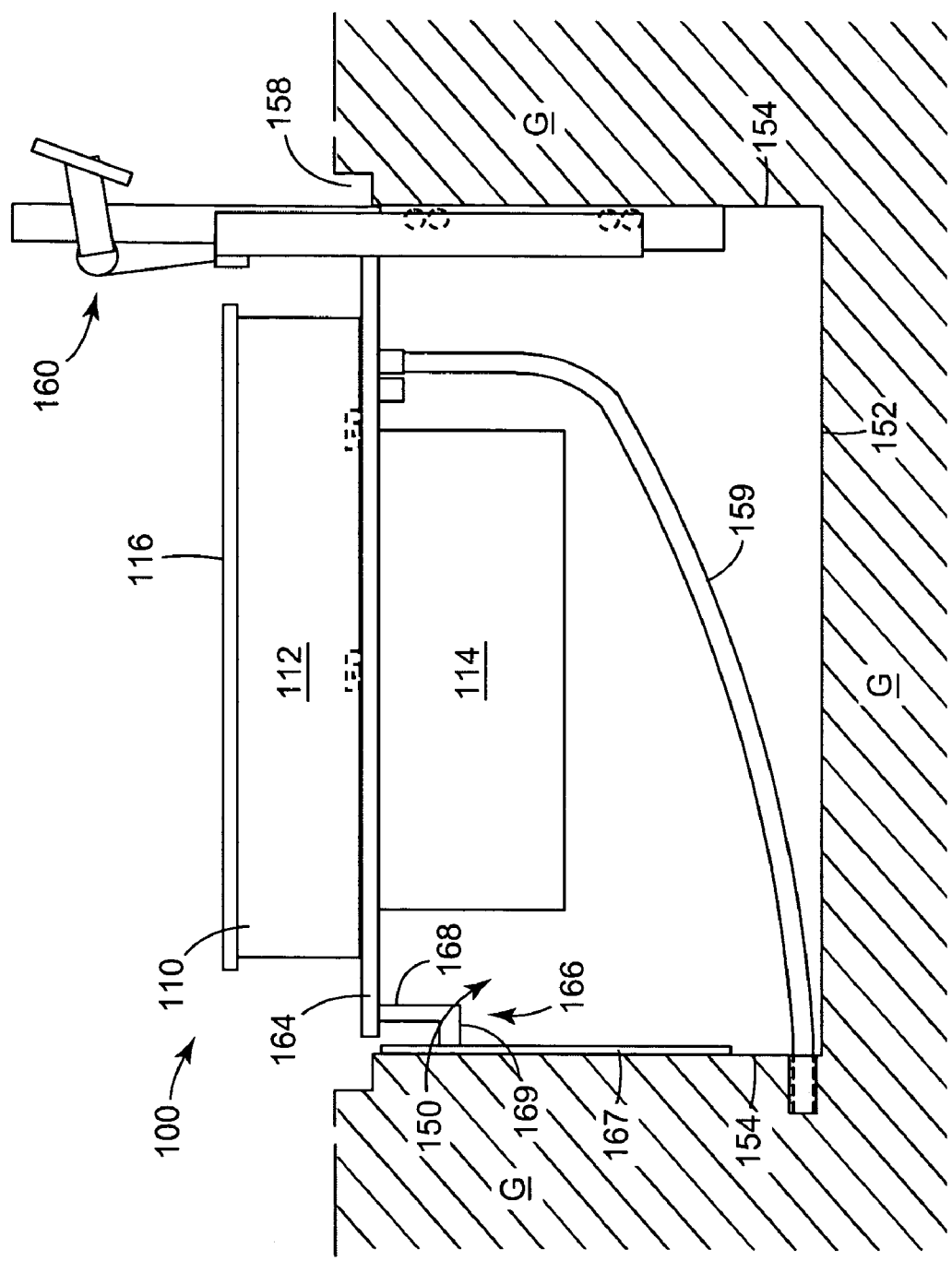
FIG. 4 is a longitudinal sectional schematic of the lifting mechanism lifting the connection system of the present invention.
Figure 5:
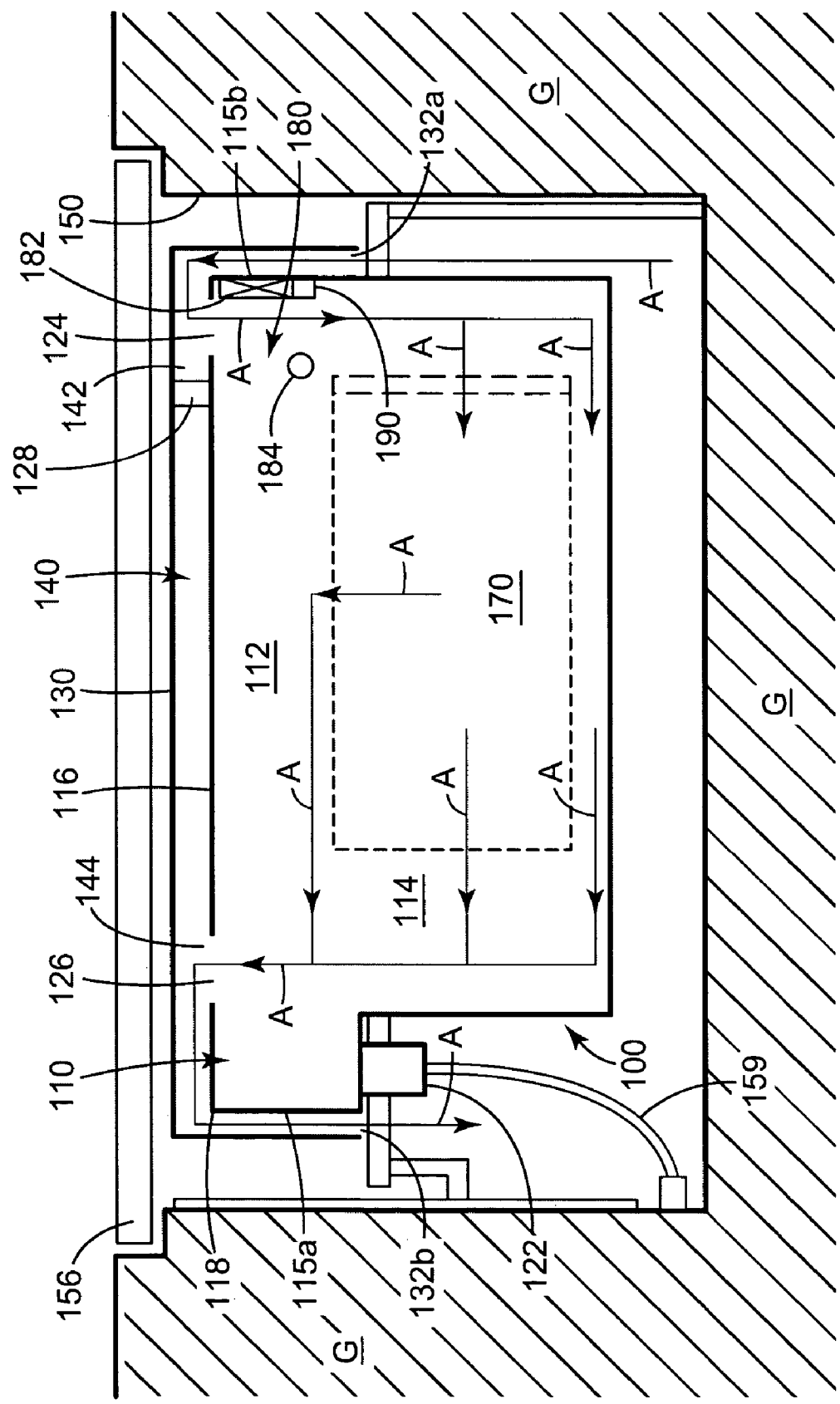
FIG. 5 is a longitudinal sectional schematic of an embodiment of a connection system of the present invention.
Figure 6:
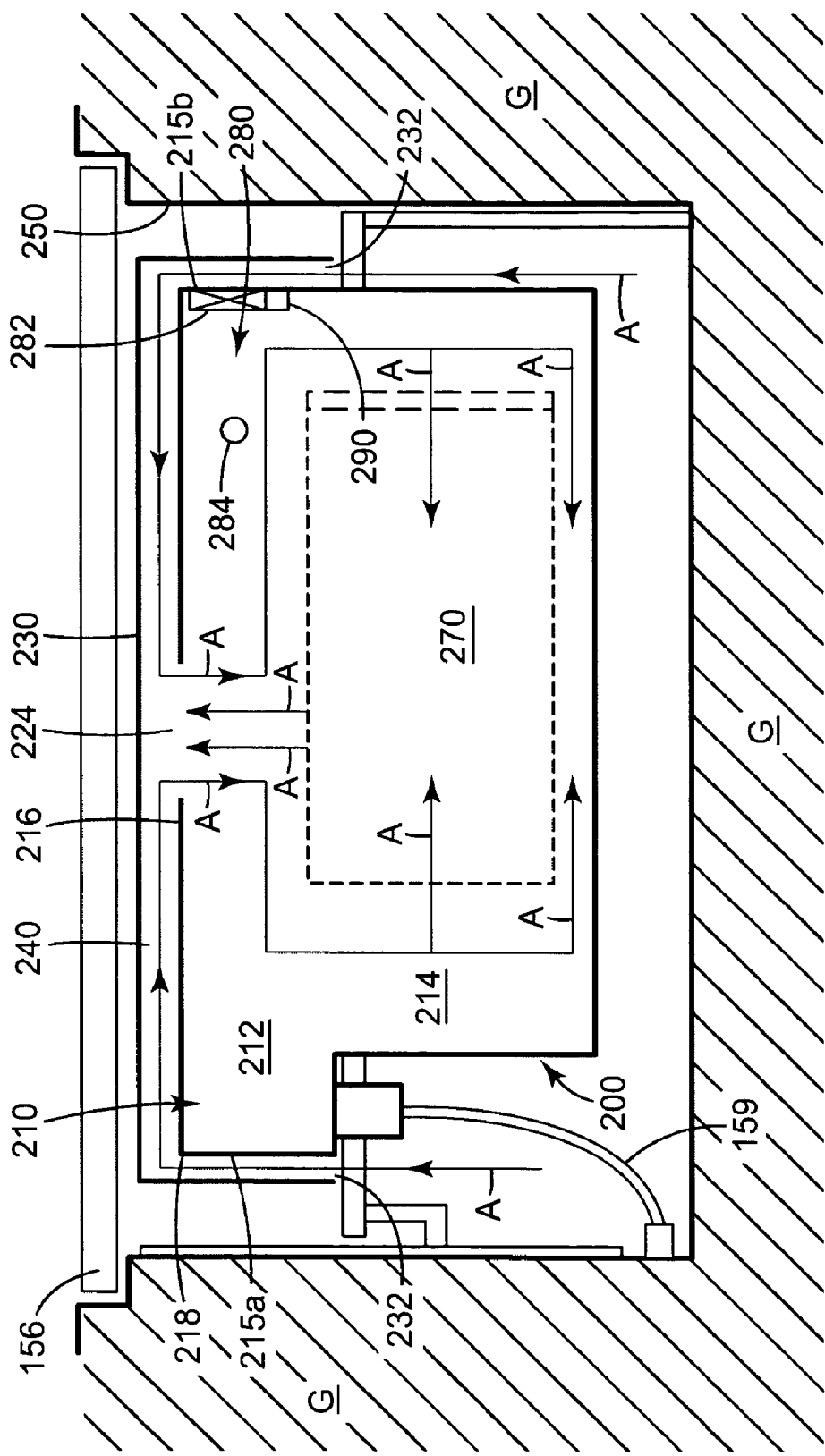
FIG. 6 is a longitudinal sectional schematic of another embodiment of a connection system of the present invention.

FIG. 4 is a longitudinal sectional schematic of the lifting mechanism for the connection system of the present invention with the cover 130 removed. In use, the underground cabinet 100 is adapted to be placed in a pit 150 in the ground G, to allow underground cables 159 to be connected to each other. The housing 110 is shown as positioned in a pit 150 lifted by a lifting mechanism 160. The lid 116 is shown in an open position, which allows access to the contents of the cavities 112 and 114. The pit 150 includes a base 152 and sidewalls 154 with the top of the pit 150 open. A surface lid 156, as shown in FIGS. 5 and 6, is provided to rest on a rim lip 158 of the pit 150 (the surface lid 156 is removed in FIG. 4). The pit 150 may be formed of any suitable material, such as concrete, and may be precast or built on site. Cables 159 enter the pit 150 for connection to the underground cabinet 100.

The pit 150 includes a lifting mechanism 160 for lifting the underground cabinet 100. The lifting mechanism 160 is coupled to one side wall 154 and is described in PCT application number PCT/US2004/009986, titled "Connection System," filed on Apr. 1, 2004, which is hereby incorporated by reference.

Tines 164 extend outwardly from the lifting mechanism 160, parallel to the base 152 of the pit 150. The tines 164 engage a lower side of the upper cavity 112, and can be moved by manipulation of the lifting mechanism 160 to raise and lower the housing 110 relative to the pit 150.

In one embodiment, a withstand leg 166 is provided opposite from the lifting mechanism 160 to support the tines 164. Located along the sidewall 154 of the pit 150 is a channel 167, within which the withstand leg 166 travels vertically. The withstand leg 166 includes a vertical section 168 and a horizontal section 169. The vertical section 168 is attached to the end of the tines 164 opposite the lifting mechanism 160. The horizontal section 169 extends from a lower portion of the vertical section 168 and connects to the channel 167. Within the channel 167 is a stop mechanism. The stop mechanism allows for the withstand leg 166 to travel up the channel 167 but prevents the withstand leg 166 from traveling down the channel unless the stop mechanism is disengaged. The stop mechanism can be a stop bar placed in the channel 167, a release pin mechanism placed within or adjacent the channel 167 or other type of device which supports the withstand leg 166 and tines 164. In use, when the lifting mechanism 160 raises or lowers the tines 164, the withstand leg 166 passes along the channel 167 and rests on the stop mechanism to support for the end of the tines 164 opposite the lifting mechanism 160.

The lifting mechanism was described with respect to underground cabinet 100, but it is understood that the lifting mechanism may be used with underground cabinet 200 as shown in FIG. 6 or other such underground cabinets within the scope of the present invention.

FIG. 5 is a longitudinal sectional schematic of an embodiment of a connection system of the present invention. In use, the underground cabinet 100 allows underground cables 159 to be connected to each other. The cables 159 enter the pit 150 and are inserted into aperture 122, which is then sealed to prevent water, dust, and airflow into or out of the cavities 112 and 114. The aperture 122 may be sealed using any number of sealing techniques and products such as Cold Shrink Tubing (CST), available from 3M Company of St. Paul, Minn., USA, which is an open ended tubular rubber sleeve of high stretch rubber that has been factory expanded and assembled onto a removable hollow core. CST Tubing may be formed from rubber, silicon rubber, or the like and can be coupled to the aperture 122 and then extended over the cables 159, as will be appreciated by persons skilled in the art. Alternatively, a seal between the aperture 122 and the cables 159 can be achieved using mastic rubber, self bonding sealing tape, adhesive lined heat shrink PVC tubing, or the like.

The presence of the lid 116 and filters covering the airflow-in opening 124 and airflow-out opening 126 prevent dust and other debris from entering the cavities 112 and 114. However, the airflow-in opening 124 and airflow-out opening 126 do not prevent moisture from entering the cavities 112 and 114. In some applications, it is desirable that cabinets, in particular underground cabinets, be capable of providing protection for the internal components at a standard of IP68 (according to (AS 1939-1990)-IEC529-1989 degrees of protection provided by enclosures for electrical equipment (IP code)). IP6X represents total protection against dust, and IPX8 represents total protection against submersion, such that IP68 is total protection against dust and submersion.

The cover 130 placed over the housing 110 provides the additional level of protection against submersion. The positioning of the cover 130 over the housing 110 forms an air reservoir 140. In the event the underground cabinet 100 is immersed in water, the rising water level will cause air to be trapped in the air reservoir 140 (which includes air trapped between the cover 130 and housing 110, as well as the air within the cavities 112 and 114). The air pressure in the air reservoir 140 prevents water from rising up the sides 113a and 113b (see FIG. 1) and ends 115a and 115b of the housing 110 to the upper lip 118, thereby preventing water from entering the cavities 112 and 114.

Electrical components 170 located within the underground cabinet 100 produce heat when operating. Typically, it is desirable to maintain the temperature within the housing 110 at less than 50 degrees Celsius under the transmission power 200 Watts. Therefore, to properly maintain the temperature within the housing 110, a heat dissipation system 180 is included to move cooler air from within the pit 150 to within the housing 110.

The heat dissipation system 180 includes an airflow agitator 182, a temperature sensor 184, and a power supply 190. The airflow agitator 182 may be a DC fan, an AC fan, or other type of device for causing airflow movement. The airflow agitator 182 is located within the housing 110 and arranged to move air from the first air reservoir 142, into the housing 110, and then out of the housing to the second air reservoir 144. As shown in FIG. 5, the airflow agitator 182 is positioned to pull air from the first air reservoir 142. However, the airflow agitator 182 may be positioned to push air from the housing 110 into the second air reservoir 144. Further, the housing may have a separate compartment, which is in communication with the airflow-in opening 124, where the fan is located to pull air from the compartment and force air into the remaining portion of the housing 110 where the electrical components 170 are located. The airflow agitator 182 may be positioned within the air reservoir 140 to either push air into the housing 110 or pull air from the housing 110.

The temperature sensor 184 senses the current temperature within the housing 110, and when the temperature within the housing 110 reaches a threshold level, the airflow agitator 182 is activated to cool the housing 110. When the air within the housing 110 has cooled to below the threshold level, the airflow agitator 182 is deactivated and is no longer supplied power to operate.

The power source 190 provides a source of power to operate the airflow agitator 182. The power source 190 may be a battery, such as a Ni—Cd battery located within the housing 110, or some other suitable power source.

When the airflow agitator 182 is activated, air from within the pit 150 is pulled into an opening 132a to the first air reservoir 142. The arrows A in FIG. 5 are representative of the airflow. Typically, the air in the pit 150 is cooler than the air within the housing 110 because the electrical components 170 within the housing 110 heat up the air within the housing 110. The airflow agitator 182 pulls the air from the first air reservoir 142 through the airflow-in opening 124 and into the housing 110. The airflow agitator 182 is designed such that cool air pulled in from the first air reservoir 142 passes across the electrical components 170 to cool the air within the housing 110 by convection. Once the air passes across the electrical components 170, the air then exits the housing 110 through the airflow-out opening 126. From the airflow-out opening 126, the warmer air enters the second air reservoir 144 and enters the pit 150. When filters cover the airflow-in opening 124 and the airflow-out opening, dust and debris are prevented from entering the housing 110.

The gasket 128 provides an airflow seal between the upper cavity 112 and the cover 130 to effectively separate the cooler air in the first air reservoir 142 going into the housing from the warmer air in the second air reservoir 144 exiting the housing. When the cover 130 is in place on the housing 110, the gasket 128 engages the opposed walls of the cover 130 and housing 110 in a sealed relation, thereby separating the reservoirs 142 and 144.

Although not shown, when the underground cabinet 100 is submerged in water, water may cover the end openings 132a and 132b into the first air reservoir 142 and out of the second air reservoir 144. However, because of the air pressure from the air trapped in the cover 130 and housing 110, the water does not reach a level high enough to enter the housing 110. When the end openings 132a and 132b are covered with water, the airflow agitator 182 would not pull in cool air from the pit 150 because the end openings 132 are blocked. However, typically when water is surrounding the underground cabinet 100, the water effectively cools the underground cabinet 100 to appropriate levels by conduction.

It is understood that although the description of the movement of the airflow was with respect to the airflow agitator 182 positioned such that it is pulling cool air from the first air reservoir 142, the airflow agitator 182 may be positioned such that it is pushing warm air from the housing 110 into the second air reservoir 144.

FIG. 6 is a side view of another embodiment of a connection system of the present invention. A similar connection system is disclose in PCT Application number PCT/US2004/009986, titled "Connection System," filed on Apr. 1, 2004, the disclosure of which is hereby incorporated by reference. An underground cabinet 200 is shown as positioned in the pit 250 in the ground G. In this embodiment the underground cabinet 200 includes a housing 210 and a separable cover 230 positioned over the housing 210. The housing includes an upper cavity 212, a lower cavity 214, sides, and ends 215a and 215b (similar to the underground cabinet shown in FIG. 1). Extending around the upper perimeter of the upper cavity 212 is an upper lip 218, to which a lid 216 may be removably attached by a variety of attaching means, such as screws, clips, or the like. The lid 216 may also be sealed to the upper lip 218.

Located on the lid 216 is an airflow opening 224, which provides airflow access into and out of the housing 210 of the underground cabinet 200. The airflow opening 224 may be covered with a filter, which prevents dust and other debris from entering the housing 210. In one embodiment, the filter can be any suitable 3M™ Filtrete™ Filter, available from 3M Company of St. Paul, Minn., USA.

The cover 230 fits over the upper cavity 212 of the housing 210 and has a bottom edge, which rests along two lower lips extending along an exterior edge of the upper cavity 212 as with cabinet 100 shown in FIGS. 1-2. The lower lips, similar to the lower lips 120 as shown in the embodiment in FIG. 1, extend on two opposites sides of the housing 210 on the upper cavity 212. The bottom edge of the cover 230 rests on and attaches to the lower lips by any suitable attaching means, such a screws, clips, or the like to secure the cover 230 to the housing 210. The underground cabinet 200 has lower lips extending only along the lengths of the sides of the underground cabinet 200. It is understood that the lower lips may extend along the lengths of the ends 215a and 215b of the underground cabinet 200.

The bottom edge of the cover 230 rests and attaches to the lower lips. However, the lower lips are not located on all four sides of the housing 210 such that when the cover 230 is in place over the housing 210, end openings 232 are formed between the cover 230 and the housing 210 on the ends 115a and 115b of the housing 210, where the lower lips are missing. The end openings 232 allow for airflow access into the gap created between an outer wall of the housing 210 and the inner wall of the cover 230, which creates an air reservoir 240 there between.

The cover 230 placed over the housing 210 provides the additional level of protection against submersion. In this embodiment, no gasket is provided between the cover 230 and the housing 210. Therefore, the positioning of the cover 230 over the housing 210 forms a single air reservoir 240. In the event the underground cabinet 200 is immersed in water, the rising water level will cause air to be trapped in the air reservoir 240 (which includes air trapped between the cover 230 and housing 210, as well as the air within the cavities 212 and 214). The air pressure in the air reservoir 240 prevents water from rising up the sides and ends 215a and 215b of the housing 210 to the upper lip 218, thereby preventing water from entering the cavities 212 and 214.

As with the embodiment described with respect to FIGS. 1-5, within the underground cabinet 200 are electrical components 270 which, when operational, create heat. Therefore, to properly maintain the temperature within the housing 210, a heat dissipation system 280 is included to move cooler air from outside of the underground cabinet 200 to within the housing 210.

The heat dissipation system 280 includes an airflow agitator 282, a temperature sensor 284, and a power supply 290. The airflow agitator 282 may be a DC fan, an AC fan, or other type of device for causing airflow movement. The airflow agitator 282 is located within the housing 210 and arranged to move air from the air reservoir 240 into the housing 210, and then out of the housing 210 through the airflow opening 224. The airflow agitator 282 may be located within the air reservoir 240 and arranged to move air from the air reservoir 240 into and out of the housing 210.

The temperature sensor 284 senses the current temperature within the housing 210, and when the temperature within the housing 210 reaches a threshold level the airflow agitator 282 is activated. The power source 290 provides a source of power to operate the airflow agitator 282. The power source 290 may be a battery, such as a Ni—Cd battery located within the housing 210, or some other suitable power source.

When the airflow agitator 282 is activated, air within the housing 210 is agitated such that some of the air exits the housing 210 and some air enters the housing 210 through the airflow opening 224. The arrows A in FIG. 6 illustrate the desired airflow patterns. The air that enters the housing 210 from the air reservoir 240 and the pit 250 is cooler than the air within the housing 210 because the electrical components 270 within the housing 210 heat up the air within the housing 210. The airflow agitator 282 ultimately pushes air from the housing 210 to the air reservoir 240 resulting in some air from the air reservoir 240 entering the housing 210. The airflow agitator 282 is designed such that cool air from the air reservoir 240 enters the housing 210 and passes across the electrical components 270 to cool the air within the housing 210 by convection. Once the air passes across the electrical components 270, some of the air then exits the housing 210 through the airflow opening 224. From the airflow opening 224, the warmer air enters the air reservoir 240 and enters the pit 250.

Although not shown, when the underground cabinet 200 is submerged in water, water may cover the openings 232 into and out of the air reservoir 240. In such a case, the airflow agitator 282 would only circulate air within the housing 210 and air reservoir 240, and the airflow agitator 282 would not pull in cool air from the pit 250 because the openings 232 are blocked. However, typically when water is surrounding the underground cabinet 200, the water effectively cools the underground cabinet 200 to appropriate levels by conduction.

Although the present invention has been described with reference to preferred embodiments, workers skilled in the art will recognize that changes may be made in form and detail without departing from the spirit and scope of the invention.

The invention claimed is:

1. An underground connection system for interconnecting communication media, the connection system comprising:
   a housing disposed in a pit, the housing having walls that define a cavity wherein the cavity houses one or more electrical components and wherein the cavity includes at least one opening into the cavity allowing airflow communication between the pit, the housing and the cavity, the airflow moving air from the pit to within the cavity;
   a cover adapted to cooperate with the housing to define an air reservoir containing at least a portion of the housing including the at least one opening, wherein the air reservoir and the housing cooperate to prevent water disposed in the pit from entering the cavity; and
   an airflow agitator causing the air to move from the air reservoir to the housing through the at least one opening, wherein the housing further comprises a lid adapted to be removably mounted to the housing and contained by the cover.

2. The connection system of claim 1, wherein the at least one opening further comprises a filter.

3. The connection system of claim 1, wherein the housing further comprises:
   an airflow-in opening in the housing contained by the cover; and
   an airflow-out opening in the housing contained by the cover.

4. The connection system of claim 3, wherein the airflow-in opening further comprises an airflow-in filter and the airflow-out opening further comprises an airflow-out filter.

5. The connection system of claim 3, further comprising:
   a gasket positioned between the housing and the cover to separate the air reservoir into a first air reservoir including the airflow-in opening and a second air reservoir to include the airflow-out opening.

6. The connection system of claim 5, wherein the airflow agitator causes air to move from the first air reservoir into the housing through the airflow-in opening and out of the housing into the second air reservoir through the airflow-out opening.

7. The connection system of claim 1, wherein the airflow agitator is located within the housing.

8. The connection system of claim 1, wherein the airflow agitator is located within the air reservoir.

9. The connection system of claim 1, wherein the airflow agitator comprises a controlled DC fan.

10. An underground connection system for interconnecting communication media, the connection system comprising:
    a housing disposed in a pit, the housing having walls that define a cavity wherein the cavity houses one or more electrical components and wherein the cavity includes an airflow-in opening into the cavity and an airflow-out opening out of the cavity allowing airflow communication between the pit, the housing and the cavity, the airflow moving air from the pit to within the cavity;
    a cover adapted to cooperate with the housing to define an air reservoir containing at least a portion of the housing including the airflow-in opening and the airflow-out opening, wherein the air reservoir and the housing cooperate to prevent water disposed in the pit from entering the cavity;
    a gasket positioned between the housing and the cover to separate the air reservoir into a first air reservoir including the airflow-in opening and a second air reservoir to include the airflow-out opening; and
    an airflow agitator causing air to move from the first air reservoir into the housing through the airflow-in opening and out of the housing into the second air reservoir through the airflow-out opening.

11. The connection system of claim 10, wherein the housing further comprises a lid adapted to be removably mounted to the housing and contained by the cover.

12. The connection system of claim 10, wherein the airflow-in opening further comprises an airflow-in filter and the airflow-out opening further comprises an airflow-out filter.

13. The connection system of claim 10, wherein the airflow agitator is located within the housing.

14. The connection system of claim 10, wherein the airflow agitator is located within the air reservoir.

15. The connection system of claim 10, wherein the airflow agitator comprises a controlled DC fan.

* * * * *